Patented Oct. 12, 1937

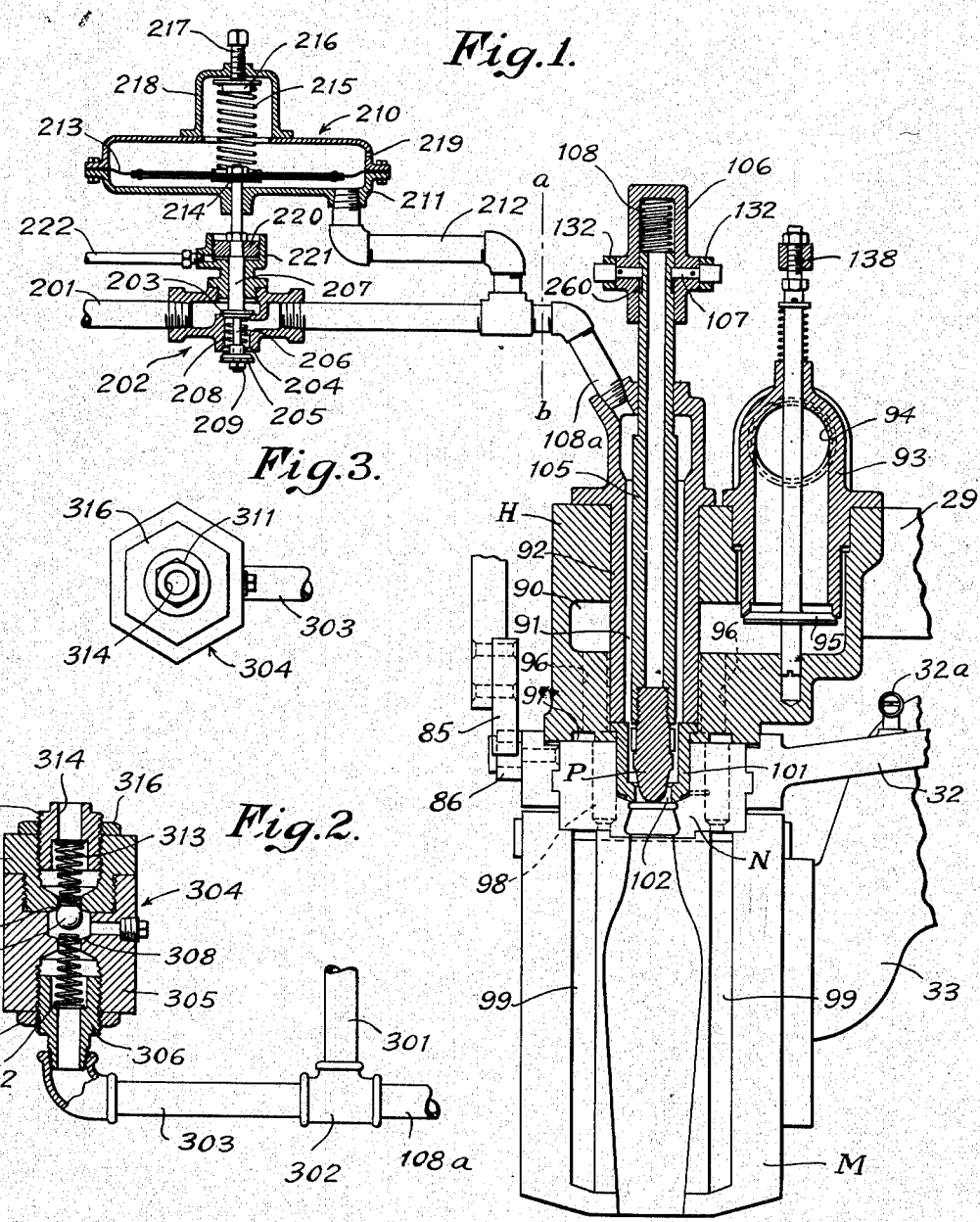

2,095,896

UNITED STATES PATENT OFFICE 2,095,896

APPARATUS FOR FORMING HOLLOW GLASS ARTICLES

Thomas Waugh, Jr., West Hartford, Conn., assignor to Hartford-Empire Company, Hartford, Conn., a corporation of Delaware Application March 20, 1936, Serial No. 69,903

12 Claims. (Cl. 49—5)

My present invention relates to apparatus for forming hollow glass articles, and more particularly for forming glass articles by blowing to expand the glass in such manner that at least a part of the article being blown is unconfined by rigid walls. Under these conditions there will be a time during the blowing thereof when the pressure required for further and undesired expansion of the glass envelop will be materially less than that initially required for effecting the desired blowing or expansion of the article, this diminution in pressure being made use of according to the present invention effectively to limit the further supplying of pneumatic pressure to the interior of the article being blown.

Among the objects of the present invention are to provide apparatus by which the continued expansion of glass articles beyond a selected point will be automatically stopped as by venting the interior of the article to the atmosphere, cutting off the further flow of pressure into the article, or both.

A further object of the invention is to provide apparatus using the principles above generally set forth for the manufacture of hollow glass articles such as bottles by what is known as the "fill and empty" process. Specifically it is my purpose in this connection to provide for the limiting of the application of blowing pressure to the interior of an article within an open-ended mold when the blowing pressure supplied to blow the central core portion of the glass from that mold has blown the central core portion completely out of the mold.

In the use of the "fill and empty" process, it has been found in certain instances at least that the application of blowing pressure to the interior of the glass in a mold which was initially completely filled with plastic glass has resulted first in the desired operation of forcing the central core portion of glass out of the mold and then in the undesired operation of blowing a large and sometimes bursting bubble of glass, which is below the mold in the event that the mold is held neck uppermost, as in the suction application of this process. The glass of this large and/or burst bubble is sometimes cooled so greatly that it is difficult to assimilate with the glass of the gathering pool, especially without introducing bubbles into the molten glass in the pool.

Also some difficulty has been experienced when a large bubble has been formed as aforesaid, due to the fact that the bottom portions of articles have been too thin, which would not be the case were it possible to stop the application of blowing pressure at the desired point. While fairly accurate timing means have been employed in controlling the application of pressure for the purpose of blowing out central core portions as aforesaid in the "fill and empty" process, it has been found that due to inevitable variations in the pressure of the air employed in commercial installations and other irregularities, which in practice it is almost impossible to avoid, the results have not been as uniform as is desired.

My present invention aims to overcome these difficulties by providing a means automatically responsive to the diminution in pressure which occurs when the central core portion has been blown completely out of the mold, due to the fact that the glass may then expand in three dimensions rather than flow in one direction as during the previous blowing out of the core portion. By the use of means automatically responsive to this diminution of pressure as aforesaid, I am enabled accurately to cut off and/or vent the further flow of pressure into the interior of the glass at substantially the desired point irrespective of certain variations in the pneumatic pressure being employed.

Further objects of the present invention will become apparent from the following specification and appended claims when taken in connection with the acompanying drawing, in which:

Figure 1 is a fragmentary view principally in vertical section showing apparatus constructed and arranged in accordance with my invention associated with a known type of "fill and empty" mechanism;

Fig. 2 is a view partly in vertical section showing a modified form of automatic control valve for use in accomplishing results similar to those attained by the form of the invention shown in Fig. 1; and Fig. 3 is a plan view of a portion of the construction shown in Fig. 2.

While I contemplate that my invention is applicable to the blowing of various types of hollow blown glass articles where some part of the article or of the glass which may be blown by the application of pressure to the interior of the article may be subject to substantially unconfined expansion, I have illustrated my invention in the accompanying drawing as applied to a known type of "fill and empty" mechanism, specifically mechanism such as is shown in the patent to Peiler 1,955,765, granted April 24, 1934. The portion of Fig. 1 to the right of the line $a$—$b$ in that figure is substantially identical with a portion of the Peiler construction specifically shown in Fig. 5 of his aforesaid patent. I have not deemed it necessary to show the entire machine for carrying out the complete forming of hollow glass articles, as the entire machine is shown and described by Peiler, so that reference may be had to that patent for a complete disclosure thereof. For convenience in cross-reference between the present case and the Peiler patent, I am employing in the present description as to the parts of the structure shown to the right of the line a—b in Fig. 1, the same reference characters as are employed by Peiler in his aforesaid patent.

Referring to Fig. 1 of the present drawing, I have shown a blank or parison mold at M, a neck ring N cooperating therewith, a neck pin or plunger P associated with said neck ring and arranged for movement into and out of cooperative relation therewith in the usual manner, and a suction and blow head generally indicated at H through which pressure and vacuum may be applied to the mold M for gathering glass therein and thereafter for forcing the central core portion of the glass out of the mold as is normally done in practising the "fill and empty" process.

The mold M is formed in mating portions or halves which are interchangeably supported by holders, one of which is shown at 33, these holders being pivoted about a common vertical axis as disclosed by Peiler. The neck ring N is also preferably made in mating portions or halves which are carried by suitable holders, one of which is shown at 32, these holders also being pivoted preferably about the same vertical axis as the holders carrying the mold M. The head H is carried by a supporting member or casting 29, which may form a part of the structure of the machine as specifically disclosed by Peiler.

Suitable means are provided for opening and closing the mold M preferably in a manner independent of the opening of the neck ring N, at least as to the opening of the mold M in advance of and during the time the neck ring N remains closed, this being taken advantage of as disclosed by Peiler in order to transfer a completed blank or parison from the mold M to a suitable final blowing mold, not shown in the accompanying drawing.

The neck ring N is constantly urged toward closed position by a tension spring 32a extending between the two arms or holders 32 by which the complementary portions of the neck ring are carried in a manner well known in the art. When it is desired to open the neck ring to release a blank or parison held therein, the halves of the neck ring may be forced apart against the tension of the spring 32a by the downward movement of a wedge 85 between suitable lugs or rollers 86, which are mounted upon the holders for the respective halves or complementary portions of the neck ring N. Suitable means may be provided as disclosed by Peiler for accomplishing the opening of the neck ring at the desired times.

Means are provided for conducting vacuum to the mold M for gathering a charge of glass therein. In the first place, such means include suitable passages and a control for the application of vacuum to grooves or ducts 99 formed between the mating halves of the mold M for applying vacuum to the mold through the joint between the halves thereof. For this purpose, a valve casing 93 is secured in a part of the head H as shown and is provided with a vacuum inlet pipe 94 communicating continuously with a suitable source of vacuum (not shown). The lower end portion of the valve casing 93 is formed as a seat for a poppet valve 95, which is mounted upon a suitable stem as shown and is arranged to be moved by a screw bolt 138 mounted in the end of a suitable actuating arm, this arm being moved at the desired times by suitable means as fully disclosed in the Peiler patent aforesaid. A compression spring is shown extending between a shoulder on the valve casing 93 surrounding the valve stem and a suitable washer pinned in position, tending at all times to urge the valve 95 towards its closed position as shown. When the valve 95 is opened, the interior of the member 93 is in open communication with an outer vacuum chamber 90 within the head H, which chamber communicates through passages or ducts 96 formed in the head with an annular chamber 97 in the underside of the head H, the latter communicating through a plurality of bores or ducts 98 in the neck ring N with the grooves or ducts 99. Thus when the valve 95 is opened, vacuum will be applied to the interior of the mold through the joint between the complementary portions thereof.

Also associated with the head H is a nipple 101, the lower annular edge portion of which is arranged to form the upper edge of the neck finish for the article in cooperation with the neck ring N. Intermediate the nipple 101 and the neck pin P in the retracted or inoperative position of the latter is an annular passage or opening 102 through which "empty blow" pressure may be supplied to the interior of the glass specifically into the blow opening initially formed by the neck pin P during the gathering of a charge of glass in the mold. During the gathering operation there is a small annular passage intermediate the nipple 101 and the neck pin P through which vacuum is also applied, preferably independently of the application of vacuum hereinbefore described, and through a passage sufficiently small so that no glass will penetrate thereinto.

Associated with the head H in a manner to confine the nipple 101 in position is a sleeve member 92, which passes through the chamber 90 as illustrated, but prevents communication between that chamber and the mold M except as hereinbefore described. Inside the member 92 is a vertically movable stem or plunger 105 into the lower end of which the neck pin P is threaded. The upper end of the stem 105 carries resiliently connected thereto a cap member 106, which is so arranged as to cause a resilient downward movement of the neck pin P from its inoperative position shown in Fig. 1 to its lower operative position through the intermediation of a compression spring 108 confined between the upper end of the cap 106 and the upper end of the stem 105. On the other hand, the neck pin P may be positively withdrawn from its operative to its inoperative position by upward movement of the cap 106, due to pins 107 carried by the cap engaging against the upper ends of grooves or slots 260 in the stem 105. Suitable means including the links 132 are provided for actuating the cap 106 to move the neck pin to and from its operative position. All these means are shown and described in the Peiler patent aforesaid and hence are not illustrated herein.

Suitable means, not shown in the accompanying drawing, but specifically shown and described in the Peiler patent, are preferably provided for independently controlling the application of vacuum to the annular space 91 intermediate the stem 105 and the sleeve member 92, so that this vacuum may communicate with the interior of the neck ring N through the space corresponding to that shown at 102, but with the neck ring P in its lower operative position, for gathering a charge of glass in the mold M. Inasmuch as this means per se forms no part of the present invention, it has not been illustrated in the accompanying drawing, but reference may be had to the Peiler patent for a complete disclosure thereof.

In operation, the mold M is moved to a position in relation to a gathering pool such that upon the application of vacuum to the body portion of the mold through the grooves 99 and to the neck portion through the annular space 91 as herein described, the mold will be completely filled with plastic glass, the neck pin P being in its lower operative position during this gathering operation. Subsequent to the filling of the mold, it is raised out of contact with the glass in the gathering pool and the neck pin P retracted to the position shown in Fig. 1 of the accompanying drawing. The application of vacuum through the neck ring from the annular space 91 is cut off prior to the retraction of the neck pin, but may be continuously applied to the body portion of the article through the grooves 99. The next operation is the supplying of pressure through the neck ring to the cavity formed initially by the neck pin P to form an enlarged cavity within the mold M by blowing the central core portion of glass substantially completely out of the mold. For this purpose the space 91 communicates at its upper end with a pipe shown at 108a (numbered 108 in the Peiler patent). It is through a portion of this pipe 108a that the line a—b passes, as shown in Fig. 1, dividing the subject matter copied from Peiler for purposes of illustrating the application of my present invention from that specifically embodying said invention.

As above generally set forth, there has been some difficulty experienced in practicing the "fill and empty" process as disclosed by Peiler due to the fact that after the "empty blow" has progressed to the point such that the central core portion is blown completely out of the mold, so that the cavity being enlarged may expand in three dimensions, instead of in one as theretofore, the resistance to further expansion was so reduced that a large bubble was formed, which often burst in practice.

It was attempted to so time the application of pressure and specifically the cutting off thereof, that this bubble would not be too greatly enlarged, so that the glass forming it would not be too difficult to assimilate with the glass in the gathering pool. Difficulty was, however, experienced in timing the cutting off of this pressure due to variations in the pressure available for use with the machine and other causes.

My present invention aims to provide automatically operating means responsive to the diminution in pressure caused by the central core portion having been completely blown out of the mold for venting the interior of the hollow glass body to the atmosphere and thereby causing a cessation of the further supplying of pressure to the interior of the glass or of positively cutting off the further flow of pressure, or both.

Referring now to the portion of Fig. 1 to the left of the line a—b in that figure, there is illustrated a pneumatic pressure supply pipe 201, which communicates with the pipe 108a through a valve generally indicated at 202. This valve is duplex in character and includes a poppet valve 203 controlling communication between the supply pipe 201 and the pipe 108a. The valve 203 cooperating with a suitable seat in the usual manner. Formed in part of the valve 202 and on the downstream side of the valve 203 and its seat is a port opening 204 controlled by a poppet valve 205, which is mounted for free sliding movement upon an extension 206 of the stem 207 to which the valve 203 is secured. Intermediate the valve 203 and the valve 205 is a compression spring 208, which tends to move the valve 205 off its seat when the valve 203 is seated as shown. Excessive movement of the valve 205 along the extension 206 is prevented by a nut or other abutment 209 secured to the extension 206 below the valve 205.

Thus, if the stem 207 is positively raised as hereinafter set forth, valve 203 will be positively unseated and valve 205 will be positively seated to close the port 204, due to the engagement of the abutment 209 with the underside of valve 205. This is the position of the parts when pressure is being supplied from the source through pipe 201 to blow the central core portion of glass out of the mold M as aforesaid. After the central core portion has been forced completely out of the mold, the valve stem 207 is moved by means hereinafter to be described to the position shown in Fig. 1, cutting off the continued flow of pressure into the interior of the glass in the mold and exerting a pressure through the spring 208 to open the valve 205 and hence to vent the interior of the glass to the atmosphere through the exhaust port 204. It will be seen that this will be assisted as to the valve 205 by such residual pressure as remains within the pipe 108a and within the glass envelope.

On the other hand, during the gathering of a charge of glass, there is, of course, no pressure being supplied through the pipe 201 and under these conditions the valve 203 is normally closed. This, as above set forth, would tend to cause the valve 205 to open in the position shown. However, the vacuum which is at this time in open communication with the pipe 108a through the head H tends to draw in air through the port 204. This inrushing air will be sufficient in its effect upon the valve 205 to cause this valve to close automatically against the compression of the light spring 208, so that the vacuum will not be effectively broken at this point.

For effecting an automatic movement of the valve 202 to cut off and vent the pressure within the glass as aforesaid, I provide a diaphragm actuating mechanism generally indicated at 210, including a chamber 211, the lower portion of which is in communication through a pipe 212 with the pipe 108a. A flexible diaphragm 213 is extended across this chamber between the upper and lower portions thereof and is rigidly connected at its center at 214 with the upper end of the valve stem 207. There is also provided a relatively light compression spring 215 extending between the upper side of the diaphragm 213 and a suitable adjustable abutment 216 formed on the lower end of a set screw 217 threaded through an upper casing extension 218, which is secured to the casing 211. The casing 211 is vented as illustrated at 219 above the diaphragm, so that this portion of the casing will always contain air at atmospheric pressure. Thus, when the pressure is being supplied to the inside of the mold M for the "empty blow", valve stem 207 will be in its raised position as aforesaid and pressure will be maintained beneath the diaphragm 213 in the casing 211 to maintain this valve open. However, once the pressure within the pipe 108a and within the glass in the mold M drops materially, due to the central core portion of glass having been blown completely out of the mold through the lower open end thereof, pressure within the casing 211 opposing the spring 215 will be materially reduced, permitting the spring 215 to exert pressure upon the valve stem 207 through the flexible diaphragm and cause the closing of the valve 203 and the opening of the valve 205, as above set forth.

From the above, it will be seen that there must necessarily be provided in addition to the above described parts, some means for initially opening the valve 203 for the initial supplying of pressure within an article by moving the valve stem 207 in opposition to the spring 215. For this purpose there is provided on the valve stem 207 a piston 220 arranged for vertical movement in a cylinder 221 formed in the upper head of the valve 202 and open above the piston 220 to the atmosphere. Communicating with the lower part of this cylinder below the piston 220, is a pipe 222 arranged to conduct pressure to the cylinder at the proper moment from some suitable timing means, such as that disclosed in the Peiler patent above mentioned. This pressure need be supplied but momentarily, just sufficient to move the valve stem 207 upwardly, and is supplied preferably at the same instant that pressure is supplied through the pipe 201 to effect the "empty blow" of the glass in the mold M. Once this blow has been started, due to the valve 203 lifting off its seat, pressure through the pipe 222 may be discontinued and vented as the diaphragm 213 will be maintained in its uppermost position by pressure passing into the lower part of the chamber 211 through the pipe 212.

The complete operation of the device will be obvious from the above description.

Turning now to the form of the invention shown in Figs. 2 and 3, pressure is conducted to the pipe 108a from some suitable source, through the pipe 201, which corresponds functionally to the pipe 201 of the form of the invention shown in Fig. 1. Connected to these pipes in some manner, as for example by a T 302 shown in Fig. 2 is a pipe 303 leading to a duplex valve generally indicated at 304. This valve is constructed of a main member 305 into the lower portion of which is threaded a nipple 306, which is in turn connected to the pipe 303 as shown. In a central chamber formed in the member 305, there is illustrated a freely movable valve ball 307, which may seat in either one of two directions, above and below as seen in Fig. 2. The lower seat 308 is provided in the member 305. The upper seat 309, upon which the valve ball 307 is shown seated, may be formed in a member 310, which is threaded into the upper portion of the member 305 as shown. Threaded into the member 310 and adjustable in respect thereto is a nipple member 311 constructed similarly to the member 306. Both these members 306 and 311 are provided with recesses or counterbores concentric therewith in which are located compression springs 312 and 313, these springs being associated respectively with seats 308 and 309 and tending to urge the ball 307 off the respective valve seats. The member 311 is provided with a continuously open port 314 communicating with the atmosphere.

Thus, if the valve ball 307 is at some intermediate position off both its seats, the pipe 303 is in open communication with the atmosphere through an open passage extending axially through the entire valve 304 and its component parts and around the ball 307 in the chamber intermediate seats 308 and 309.

During the gathering of a charge of glass, vacuum is applied within the mold M and communicates directly with the pipe 108a as above set forth in describing the Fig. 1 form of invention. This vacuum will pull the ball 307 down onto its seat 308 against the compression of the spring 312, due to the inflow of air through the port 314 forcing the ball downward. This will cut off communication between the vacuum and the atmosphere through the valve 304 and hence permits proper gathering of a charge of glass. At the termination of the application of vacuum, the interior of the system will be vented due to the ball 307 being forced off its lower seat 308 by the expansion of spring 312.

When pressure is supplied at a relatively rapid rate through the pipe 301 for the "empty blow" and during the period that the central core portion of glass is being forced out of the mold, pressure will also flow through the pipe 303 into the valve 304 and will force the ball 307 to move onto its upper seat 309 against the compression of the spring 313, thus again closing off communication through the valve 304 to the atmosphere through port 314. However, after the central core portion of glass has been forced completely out of the mold by the empty blow pressure, the pressure within the system will drop, permitting the unseating of ball 307 by the expansion of spring 313, thus opening communication between the pipe 301 and the atmosphere, through valve 304 and port 314.

A fairly delicate adjustment of the compressive force effective by springs 312 and 313 is required. For this purpose each of the nipples 306 and 311 is adjustable in respect to the valve 304 so as to control the effective compressive force of these springs upon the valve ball 307, the adjustment after being made being secured by jam nuts 315 and 316 respectively.

From the above, it will be seen that I have provided automatic means by which pressure may be vented to the atmosphere and effectively cut off in response to a diminution in the pressure existing within a body of glass being blown to hollow form.

It will be understood that while I have illustrated and specifically described the invention as applying to a structure for manufacturing glassware by the "fill and empty" process, particularly as shown in the Peiler Patent 1,955,-765 as aforesaid, I do not wish to be limited to this particular application of the invention, but contemplate that it may be useful wherever glass is being blown to hollow form and is not completely confined, such for example as in the intermediate blowing step of the usual "paste mold process" of manufacturing hollow glassware, and also other uses which will occur to those skilled in the art. I do not wish to be limited, therefore, except by the scope of the appended claims, which are to be construed as broadly as the state of the prior art permits.

I claim:

1. Apparatus for forming hollow glass articles, comprising a support for a mass of plastic glass to be formed into a glass article, means for supplying pneumatic pressure to the interior of the mass of glass held in said support to expand a cavity therein, and means operating automatically and in response to diminution in the pressure existing within said cavity during the expansion thereof for causing a diminution of the supply of the pneumatic pressure to said cavity.

2. Apparatus for forming hollow glass articles, comprising a support for a mass of plastic glass to be formed into a glass article, means for supplying pneumatic pressure to the interior of the mass of glass held in said support to expand a cavity therein, and means operating automatically and in response to diminution in the pressure existing within said cavity during the expansion thereof for venting said cavity to the atmosphere and for thereby inhibiting the further expansion of said cavity.

3. Apparatus for forming hollow glass articles, comprising a mold adapted to be completely filled with plastic glass through an open end thereof, means for supplying pneumatic pressure to the interior of said mold through the opposite end thereof to blow the central core portion of a charge of glass out of the mold through said open end, and means operating automatically and in response to a diminution in the pressure existing within said mold during the blowing out of the central core portion of glass for causing a diminution of the supply of the pneumatic pressure to said mold.

4. Apparatus for forming hollow glass articles, comprising a mold adapted to be completely filled with plastic glass through an open end thereof, means for supplying pneumatic pressure to the interior of said mold through the opposite end thereof to blow the central core portion of a charge of glass out of the mold through said open end, and means operating automatically and in response to the central core portion of a charge of glass having been blown completely out of the mold for causing a diminution of the supply of the pneumatic pressure to said mold.

5. Apparatus for forming hollow glass articles, comprising a mold adapted to be completely filled with plastic glass through an open end thereof, means for supplying pneumatic pressure to the interior of said mold through the opposite end thereof to blow the central core portion of a charge of glass out of the mold through said open end, and means operating automatically and in response to a diminution in the pressure existing within said mold during the blowing out of said central core portion of glass for venting the interior of the hollow body of glass in the mold to the atmosphere.

6. Apparatus for forming hollow glass articles, comprising a suction gathering mold adapted to be completely filled with plastic glass drawn in through the open lower end thereof, a neck ring and a neck pin cooperating with the upper end of said mold for forming a finished neck portion on the glass drawn into the mold and an initial blow opening therein respectively, means for applying vacuum to said mold to gather a charge of plastic glass therein, means thereafter operating to supply pneumatic pressure through said neck ring to the initial cavity formed in the glass by said neck pin to blow the central core portion of a charge of glass out of the mold through the open lower end thereof, and means operating automatically and in response to a diminution in the pressure existing within said mold during the blowing out of the central core portion of glass for causing a diminution of the supply of the pneumatic pressure to said mold.

7. Apparatus for forming hollow glass articles, comprising a suction gathering mold adapted to be completely filled with plastic glass drawn in through the open lower end thereof, a neck ring associated with the upper end of said mold, a neck pin arranged to be moved into and out of cooperative relation with said neck ring, a head associated with said neck ring and neck pin, means associated with the aforesaid members for substantially independently applying vacuum to the body portion of said mold and to said neck ring around said neck pin in the operative position of the latter, means for supplying pneumatic pressure through said head to the cavity in the glass formed by said neck pin subsequent to the cutting off of vacuum around the neck pin and the movement thereof to its inoperative position to blow the central core portion of a charge of glass out of the mold through the open lower end thereof, and means operating automatically and in response to the central core portion of a charge of glass having been blown completely out of the mold for venting the interior of the hollow body of glass in the mold to the atmosphere.

8. Apparatus for forming hollow glass articles, comprising a mold adapted to be completely filled with plastic glass through an open end thereof, means including a pipe for conducting pneumatic pressure to the interior of said mold through the opposite end thereof to blow the central core portion of a charge of glass out of the mold through said open end, and an automatic diaphragm actuated valve interposed in said pipe and so constructed and arranged as to cut off the flow of pneumatic pressure through said pipe to the interior of the body of glass in the mold in response to a diminution in the pressure existing within said mold during the blowing out of the central core portion of glass therefrom.

9. Apparatus for forming hollow glass articles, comprising a mold adapted to be completely filled with plastic glass through an open end thereof, means including a pipe for conducting pneumatic pressure to the interior of said mold through the opposite end thereof to blow the central core portion of a charge of glass out of the mold through said open end, a valve interposed in said pipe for controlling the supplying of pneumatic pressure therethrough and for also controlling a vent to the atmosphere from the portion of the pipe on the downstream side of said valve, and diaphragm actuating means for operating said valve so constructed and arranged as to cut off further flow of pneumatic pressure through said pipe to the interior of the body of glass in the mold and to vent the interior of said body of glass to the atmosphere both in response to a diminution in the pressure existing within said mold during the blowing out of the central core portion of glass therefrom.

10. Apparatus for forming hollow glass articles, comprising a suction gathering mold adapted to be completely filled with plastic glass drawn in through the open lower end thereof, means for applying vacuum to the upper end of said mold for gathering a charge of plastic glass therein, means including a pipe thereafter operating to supply pneumatic pressure to the interior of said mold to blow the central core portion of a charge of glass gathered therein out through the open lower end of the mold, a compound valve associated with said pipe having a portion arranged to open and close communication between the portions of the pipe on opposite sides of the valve and a second portion movable with and in respect to the first named portion for opening and closing a vent opening communicating between the portion of the pipe on the downstream side of the valve and the atmosphere, a common valve stem carrying both said valve portions, diaphragm actuating means communicating with said pipe on the downstream side of said valve and arranged to actuate said valve stem, the parts being constructed and arranged so that upon diminution in the pressure within the body of glass in said mold caused by the central core portion having been blown completely out of said mold, said diaphragm will be moved to close communication between the two portions of said pipe on opposite sides of said valve and to open communication between the downstream side of said valve and the atmosphere, and means for resetting said valve for opening communication between the two portions of said pipe for the supplying of pressure to the interior of said mold, the portion of said valve controlling the vent to the atmosphere being so arranged that upon the application of vacuum to said mold for gathering a charge of glass therein, said vent will automatically be closed by said vacuum.

11. Apparatus for forming hollow glass articles, comprising a mold adapted to be completely filled with plastic glass through an open end thereof, means for supplying pneumatic pressure to the interior of said mold through the opposite end thereof to blow the central core portion of a charge of glass out of the mold through said open end, a port associated with the last named means and communicating with the atmosphere for venting the interior of the hollow body of glass in the mold, a valve controlling exhaust of pressure through said port so constructed and arranged as to leave the port open for exhaust when no pressure is being supplied to the interior of the glass in the mold or when that pressure falls below a predetermined amount, and to be moved to close said port during the blowing out of the central core portion by the pneumatic pressure supplied for blowing out said core portion.

12. Apparatus for forming hollow glass articles, comprising a suction gathering mold adapted to be completely filled with plastic glass through the open lower end thereof, means for applying vacuum to said mold to gather a charge of plastic glass thereinto, means including a pipe thereafter operative to supply pneumatic pressure into the glass in said mold through the upper end thereof to blow the central core portion of the glass out through the open lower end of the mold, a duplex valve associated with said pipe and having an opening to the atmosphere, a movable ball valve member therein, two seats in said valve for cooperation with said movable ball member, the seating of the ball upon either of which cuts off communication between said pipe and the vent to the atmosphere, and a spring cooperable with said ball and associated with each of said seats for urging the ball off said seats respectively, the parts of said valve being so constructed and arranged that upon the application of vacuum to gather a charge in said mold as aforesaid, the air rushing into the valve through the vent thereof from the atmosphere will force the ball member onto one of said seats in opposition to the spring associated therewith, the application of pneumatic pressure to the mold to blow the central core portion of glass out of the mold as aforesaid being effective to force the ball member onto the other of said seats against the spring associated therewith to close the vent to the atmosphere, and a diminution in pressure within the mold due to the central core portion of glass having been blown completely out of the mold will be effective in conjunction with the spring associated with the second-named seat to unseat the ball member therefrom and open communication between said pipe and the atmosphere through the vent passage of said valve.

THOMAS WAUGH, Jr.